United States Patent [19]

Suzuki et al.

[11] 4,047,089
[45] Sept. 6, 1977

[54] STARTING CIRCUIT FOR INVERTER

[75] Inventors: Tadao Suzuki; Tadao Yoshida; Shigeaki Wachi, all of Tokyo, Japan

[73] Assignee: Sony Corporation, Tokyo, Japan

[21] Appl. No.: 694,713

[22] Filed: June 10, 1976

[30] Foreign Application Priority Data

June 14, 1975 Japan .................................. 50-72393

[51] Int. Cl.$^2$ .......................................... H02M 3/335
[52] U.S. Cl. .......................................... 363/49; 363/22
[58] Field of Search ........................... 321/45 R, 45 S; 331/113 A

[56] References Cited

U.S. PATENT DOCUMENTS

| | | | |
|---|---|---|---|
| 3,085,211 | 4/1963 | Jensen et al. ...................... | 321/45 S |
| 3,434,035 | 3/1969 | Phillips .............................. | 321/45 S |
| 3,434,036 | 3/1969 | Phillips .............................. | 321/45 S |
| 3,528,031 | 9/1970 | Palmer et al. ..................... | 331/113 A |

Primary Examiner—William M. Shoop
Attorney, Agent, or Firm—Hill, Gross, Simpson, Van Santen, Steadman, Chiara & Simpson

[57] ABSTRACT

A starting circuit for an inverter includes, at least, a control winding provided in connection with a saturable magnetic core of an input transformer of the inverter, a transistor and a capacitor. When a DC voltage source is activated, a discharge current of the capacitor flows through the collector-emitter circuit of the transistor and the control winding so as to start the switching operation of the inverter. A control circuit is provided for detecting a secondary voltage of the inverter so as to cut off the operation of the starting circuit after the inverter starts.

9 Claims, 2 Drawing Figures

STARTING CIRCUIT FOR INVERTER

BACKGROUND OF THE INVENTION

1. Field of the Invention

This invention relates to a starting circuit for an inverter, and more particularly to a starting circuit for an inverter by which it can be certain that the inverter is started.

2. Description of the Prior Art

A DC-DC converter including a starting circuit 10, as shown in FIG. 1, is well known. In FIG. 1, an AC voltage of a predetermined level is applied to a pair of input terminals 1a and 1b, and it is rectified by a rectifying circuit 2 which is constituted, for example, by a diode-bridge. A positive voltage is led out in a line 4a, while a negative voltage is led out in another line 4b. Smoothing capacitors $C_1$ and $C_2$ are connected in series with each other between the lines 4a and 4b. The line 4a is connected to one end of a parallel circuit of a capacitor $C_5$ and a resistor $R_7$, to the anode side of a thyristor 8 and to the collector electrode of a transistor $Q_1$.

The other end of the parallel circuit of the capacitor $C_5$ and the resistor $R_7$ is connected to the gate terminal of the thyristor 8. The cathode side of the thyristor 8 is connected through a parallel circuit of a current limiting resistor $R_8$ and a speed-up capacitor $C_6$ to the base electrode of the transistor $Q_2$. The collector electrode of the transistor $Q_2$ and the emitter electrode of the transistor $Q_1$ are connected to each other, and they are connected to one end of the secondary winding 11c of an input transformer 11 having a saturable magnetic core, and to one end of another secondary winding 11b of the input transformer 11. The other end of the secondary winding 11b is connected to the base electrode of the transistor $Q_1$. A further secondary winding 11d is connected to the transistor $Q_2$. The secondary windings 11b and 11d are wound round the saturable magnetic core of the input transformer 11 in opposite directions or in opposite polarities to each other. The secondary winding 11c is used for positive feedback, and so it works to increase voltages induced at the secondary windings 11b and 11d so as to compensate the base voltages of the transistors $Q_1$ and $Q_2$ when the inverter is highly loaded. The other end of the secondary winding 11c is connected through the primary winding 5a of the output transformer 5 to the connection point between the capacitors $C_1$ and $C_2$. The base electrode of the transistor $Q_2$ is connected to one end of the secondary winding 11d of the input transformer 11. The other end of the secondary winding 11d is connected to the emitter electrode of the transistor $Q_2$ and to the line 4b. Accordingly, the transistor $Q_2$ is put into the conductive state initially with the current supplied to the base electrode of the transistor $Q_2$ through the thyristor 8, and then with the voltage induced at the secondary winding 11d.

Both ends of a secondary winding 5b of the output transformer 5 are connected to a rectifying circuit 12 formed by a diode bridge to apply the output voltage of the output transformer 5 to the rectifying circuit 12. The output voltage is rectified by the rectifying circuit 12, so that a DC voltage of a predetermined level is obtained from the output terminals 14a and 14b. Another secondary winding 5c of the output transformer 5, as a feedback winding, is connected through a resistor $R_6$ to the primary winding 11a of the input transformer 11. Thus, a part of the output obtained from the output transformer 5 is fed back through the resistor $R_6$ to switch on and off alternately the transistors $Q_1$ and $Q_2$.

Next operation of the above described circuit will be described.

With the application of the AC voltage to the input terminals 1a and 1b of the rectifying circuit 2, a charging current flows into the capacitor $C_5$ from the line 4a to put the thyristor 8 into the conductive state. Accordingly, a current from the line 4a is supplied through the thyristor 8 and the capacitor $C_6$ to the base electrode of the transistor $Q_2$ to put the latter into the conductive state. Accordingly, as the capacitor $C_6$ is charged, namely the current flowing through the capacitor $C_6$ decreases, the current flowing through the resistor $R_8$ increases. Thus, a collector current of the transistor $Q_2$ flows from the capacitor $C_2$ to the line 4b through the primary winding 5a of the output transformer 5, the secondary winding 11c of the input transformer 11, and the transistor $Q_2$. As a result, an output voltage having a width corresponding to the time for which the transistor $Q_2$ is put in the conductive state, is obtained from the secondary winding 5b of the output transformer 5.

When the output voltage is obtained from the one secondary winding 5b of the output transformer 5, another output voltage is obtained from the other secondary winding 5c of the output transformer 5, and it is applied through the resistor $R_6$ to the primary winding 11a of the input tranformer 11. Accordingly, secondary voltages are induced at the secondary windings 11b and 11d in opposite polarities to each other. With the application of the induced voltage of the secondary winding 11d, the transistor $Q_2$ continues to be put into the conductive state. And with the increase of the voltage applied to the primary winding 11a, the magnetic core of the input transformer 11 is saturated to put the induced voltages of the secondary windings 11b and 11d nearly into zero, so that the transistor $Q_2$ is suddenly put into the non-conductive state. The current to the primary winding 5a of the output transformer 5 from the capacitor $C_2$ is suddenly interrupted. Thus, a higher voltage is induced at the secondary winding 5c in the reverse polarity to the previously induced voltage, and it is applied to the primary winding 11a of the input transformer 11. The magnetic core of the input transformer 11 becomes unsaturated, and so voltages are induced at the secondary windings 11b and 11d in the reverse polarities to the previously induced voltages, respectively. As a result, the transistor $Q_1$ is now put into the conductive state with the application of the induced voltage of the secondary winding 11b to the base electrode of the transistor $Q_1$. A current now flows from the line 4a to the capacitor $C_1$ through the transistor $Q_1$, the secondary winding 11c and the primary winding 5a of the output transformer 5. The output is obtained from the secondary winding 5b of the output transformer 5. The other output from the secondary winding 5c is applied to the primary winding 11a of the input transformer 11. As above described, the magnetic core of the input transformer 11 is again saturated to suddenly put the transistor $Q_1$ into the non-conductive state. And the transistor $Q_2$ is again put into the conductive state. Thus, the transistors $Q_1$ and $Q_2$ are alernately put into the conductive or non-conductive state. A continuous pulse output of a predetermined frequency and level is obtained from the secondary winding 5b of the output transformer 5. The continuous pulse output is rectified by the rectifying circuit 12. A DC voltage of a predetermined level is obtained from the output terminals 14a and 14b, and it is supplied to a load circuit (not shown).

However, in the above described circuit, the starting operation by the thyristor 8 is very unstable, and the switching operation of the transistors cannot often be smoothly effected.

A part of the current flowing through the thyristor 8 is shunt to the secondary winding 11d of the input transformer 11. Accordingly, the base current to the transistor $Q_2$ is not sufficient enough to put the transistor $Q_2$ into the conductive state, in some cases. Thus, the starting operation is very unstable. Even when the switching operation of the transistors $Q_1$ and $Q_2$ is smoothly started, the conduction and non-conduction of the thyristor 8 are repeated in accordance with the time constant of the parallel circuit of the capacitor $C_6$ and resistor $R_8$, and so the current flowing through the parallel circuit becomes load or loss in operation.

SUMMARY OF THE INVENTION

Accordingly, it is an object of this invention to provide a starting circuit for an inverter which overcomes the above-described disadvantages of the conventional starting circuit.

Another object of this invention is to provide a starting circuit for an inverter which can be cut off from the inverter circuit after the operation of the inverter starts.

A further object of this invention is to provide a starting circuit for an inverter which can be controlled in operation with the detection of the secondary voltage of the inverter.

In accordance with one aspect of the present invention, a starting circuit for an inverter is provided which includes:

a DC voltage source having first, second and voltage reference terminals; an input transformer having a primary winding, a pair of secondary windings and a saturable magnetic core; an output transformer having a primary winding, a secondary winding and a feedback winding; first and second transistors each having base, emitter and collector electrodes, the collector-emitter circuits of which are connected, through the primary winding of the output transformer, between the first and voltage reference terminals of the DC voltage source, and between the second and voltage reference terminals thereof, respectively, and the base-emitter circuits of which are connected across the corresponding secondary windings of the input transformer respectively; a circuit for connecting the primary winding of the input transformer to the feedback winding of the output transformer; a DC voltage output circuit connected across the secondary winding of the output transformer; a first control circuit including at least a control winding provided in connection with the saturable magnetic core of the input transformer, and flowing an exciting current through the control winding so as to put one of the first and second transistors in its conductive state when the DC voltage source is operated; and a second control circuit for detecting the secondary voltage of the output transformer and stopping the operation of the first control circuit when the secondary voltage reaches a predetermined value.

The above and other objects, features and advantages of this invention will become apparent from the following detailed description of illustrative embodiment shown in the accompanying drawing.

DESCRIPTION OF THE PREFERRED EMBODIMENTS

Figure 1:
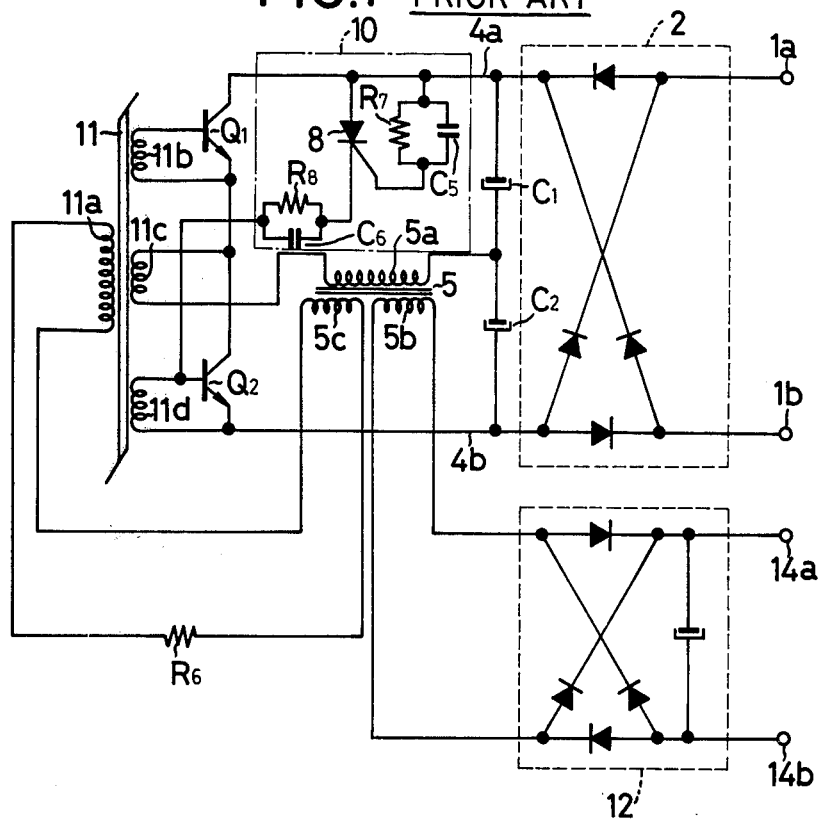
FIG. 1 is a circuit diagram of a prior art inverter including a conventional starting circuit.

One embodiment of this invention, applied to a starting circuit for an inverter, will be described with reference to FIG. 2. Parts in FIG. 2 which correspond to the parts in FIG. 1, are denoted by the same reference numerals, which will not be described in detail.

Figure 2:
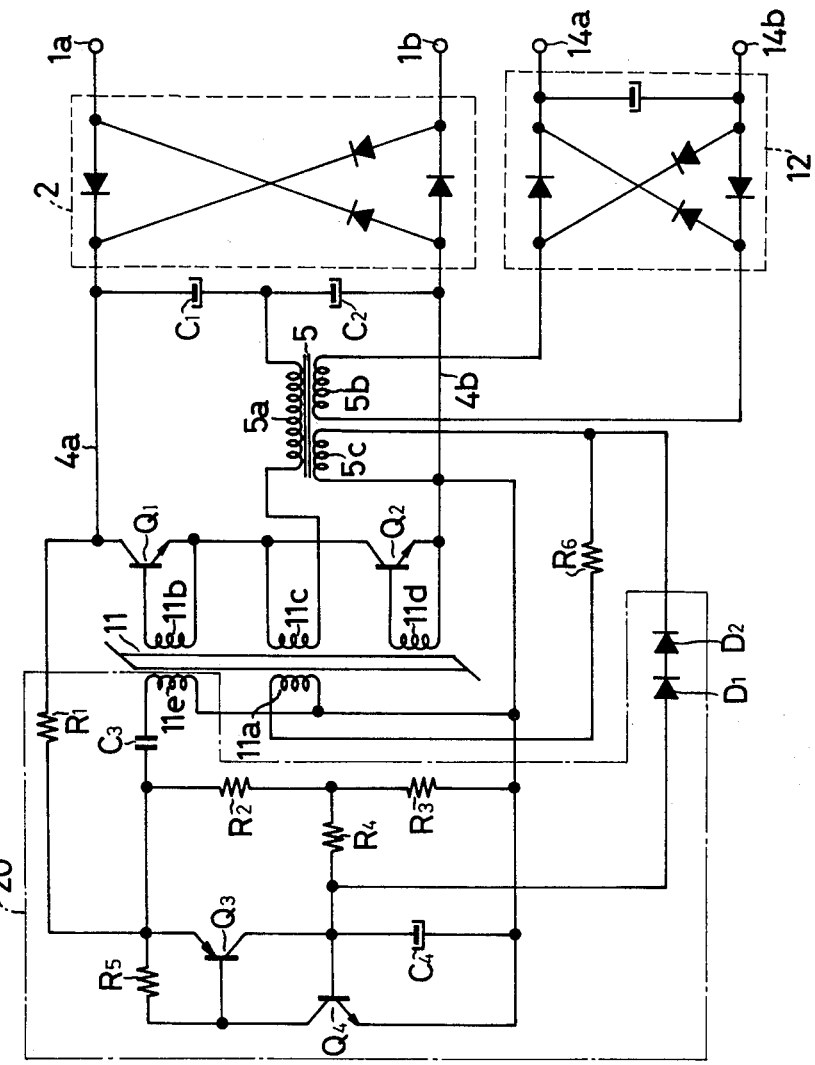
FIG. 2 is a circuit diagram of an inverter including a starting circuit according to one embodiment of this invention.

In FIG. 2, a DC-DC converter includes a starting circuit 20 according to this invention, instead of the conventional starting circuit 10 having the thyristor 8 of FIG. 1.

A DC source voltage of a predetermined level is supplied through a resistor $R_1$ to the starting circuit 20. One end of the resistor $R_1$ is connected to resistors $R_2$ and $R_5$, a capacitor $C_3$ and further to an emitter electrode of a PNP transistor $Q_3$. The other end of the resistor $R_5$ is connected to the base electrode of the transistor $Q_3$ to decide a base voltage therefor, and further to the collector electrode of a transistor $Q_4$. A resistor $R_3$ is connected in series with the resistor $R_2$. The resistors $R_2$ and $R_3$ function as a voltage-divider. The connecting point between the resistors $R_2$ and $R_3$ is connected through a resistor $R_4$ to the base electrode of the transistor $Q_4$ and to a collector electrode of the transistor $Q_3$. Further, the base electrode of the transistor $Q_4$ is connected through diodes $D_1$ and $D_2$ to one end of the feedback winding 5c of the output transformer 5. A smoothing capacitor $C_4$ is connected between the base and emitter electrodes of the transistor $Q_4$.

The other end of the capacitor $C_3$ is connected to one end of a starting winding 11e which is newly wound as a primary winding around the magnetic core of the input transformer 11. The other end of the starting winding 11e is connected to the line 4b. Accordingly, a discharge current of the capacitor $C_3$ flows through the starting winding 11e to induce secondary voltages at the secondary windings 11b and 11d. The other end of the starting winding 11e is connected further to one end of the primary winding 11a. The other end of the primary winding 11a is connected through the resistor $R_6$ to the feedback winding 5c of the output transformer 5 to supply a part of the output of the output transformer 5.

Next, the operation of the above described circuit will be described.

With the application of the AC voltage source to the input terminals 1a and 1b, a voltage of positive polarity is led out in the line 4a, while another voltage of negative polarity is led out in the line 4b. The voltage of positive polarity is applied through the resistor $R_1$ to the starting circuit 20. The capacitor $C_3$ is gradually charged, and its charging current becomes nearly zero after a predetermined time. At the same time, the voltage across the capacitor $C_4$ gradually rises up, and it is applied to the base electrode of the transistor $Q_4$. When it rises above a certain level, for example, beyond 0.6 V, the transistor $Q_4$ is put into its conductive state. Accordingly, the collector voltage of the transistor $Q_4$ lowers to put the transistor $Q_3$ into the conductive state. When both the transistors $Q_3$ and $Q_4$ are thus put into the conductive state, the resistance between the one end of the capacitor $C_3$ and the line $4b$ becomes very low. Accordingly, the capacitor $C_3$ is instantaneously discharged through the emitter-base circuit of the transistor $Q_3$ and the collector-emitter circuit of the transistor $Q_4$. The discharge current flows through the starting winding $11e$ to induce a predetermined voltage at the secondary winding $11b$ of the input transformer 11.

The induced voltage is applied to the base electrode of the transistor $Q_1$ to put the latter into the conductive state. Accordingly, a current from the line $4a$ flows through the transistor $Q_1$, the secondary winding $11c$ of the input transformer 11, and the primary winding $5a$ of the output transformer 5 to the capacitor $C_1$. Secondary voltages are induced at the secondary windings $5b$ and $5c$ by the current flowing through the primary winding $5a$. The output voltage of the secondary winding $5c$ is fed back to the primary winding $11a$ of the input transformer 11. The magnetic core of the input transformer 11 is presently saturated, so that the induced voltage of the secondary winding $11b$ becomes zero, and the transistor $Q_1$ is suddenly put into the non-conductive state. Accordingly, as above described in FIG. 1, the feedback voltage in the reverse polarity to the previous feedback voltage is applied to the primary winding $11a$ of the input transformer 11 to induce the voltage at the secondary winding $11d$ to put the transistor $Q_2$ into the conductive state. With the conduction of the transistor $Q_2$, a current from the capacitor $C_2$ flows through the primary winding $5a$ of the output transformer 5, the secondary winding $11c$ of the input transformer 11 and the transistor $Q_2$ to the line $4b$. The output voltage of the secondary winding $5b$ is applied to the rectifying circuit 12. The magnetic core of the input transformer 11 is again saturated, and the transistor $Q_2$ is suddenly put into the non-conductive state. Next, the voltage is induced at the secondary winding $11b$ to again put the transistor $Q_1$ into the conductive state.

As above described, the transistors $Q_1$ and $Q_2$ are alternately put into the conductive or non-conductive state, so that a continuous pulse output voltage is obtained from the secondary winding $5b$ of the output transformer 5. The pulse output voltage is rectified by the rectifying circuit 12. A DC output is led out from the output terminals $14a$ and $14b$.

The output voltage of the other secondary winding $5c$ is rectified by the diodes $D_1$ and $D_2$ to obtain a negative voltage beyond a predetermined level at the base electrode of the transistor $Q_4$. With the application of the negative voltage, the transistor $Q_4$ and accordingly, the transistor $Q_3$ are put into the non-conductive state. As a result, as soon as the ON-OFF operation of the transistors $Q_1$ and $Q_2$ is started, the operation of the starting circuit 20 is stopped. In the circuit according to this invention, the charging voltage of the capacitor $C_3$ to start the switching operation of the transistors $Q_1$ and $Q_2$ can be adjusted in accordance with the load by making the resistors $R_2$ and $R_3$ variable, so that the starting operation can be surely effected.

According to this invention, for the inverter including a pair of transistors for oscillation, a starting circuit is provided which comprises a capacitor for imparting a starting voltage to one of the transistors, and a switching element for charging and discharging the capacitor, and a part of the output of the inverter is rectified and then applied to the starting circuit to put the latter into inactive condition. As soon as the inverter is put into its active condition, the starting circuit is put into the OFF-state with the application of a part of the output of the inverter. Accordingly, the starting circuit does not become a load to the inverter in operation. Moreover, the starting operation can be surely effected.

While there have been described preferred embodiments of the invention, obviously modifications and variations are possible in light of the above teachings. It is, therefore, to be understood that within the scope of the appended claims, the invention may be practiced otherwise than as specifically described.

We claim as our invention:

1. A starting circuit for an inverter comprising:
   a. a DC voltage source having first, second and voltage reference terminals;
   b. an input transformer having a primary winding, a pair of secondary windings and a saturable magnetic core;
   c. an output transformer having a primary winding, a secondary winding and a feedback winding;
   d. first and second transistors each having base, emitter and collector electrodes, the collector-emitter circuits of which are connected, through the primary winding of said output transformer, between the first and voltage reference terminals of said DC voltage source, and between the second and voltage reference terminals thereof, respectively, and the base-emitter circuits of which are connected across the corresponding secondary windings of said input transformer, respectively;
   e. circuit means for connecting the primary winding of said input transformer to the feedback winding of said output transformer;
   f. first control means including at least a control winding provided in connection with said saturable magnetic core of said input transformer, and capacitor means connected to said control winding for supplying an exciting current which flows through said control winding then the capacitor means is discharged so as to put one of said first and second transistors in its conductive state when said DC voltage source is operated; and
   g. second control means for detecting the secondary voltage of said output transformer and stopping the operation of said first control means when the secondary voltage reaches a predetermined value.

2. A starting circuit for an inverter according to claim 1, in which said first control means includes a first capacitor and a third transistor having base, emitter and collector electrodes, said first capacitor being connected in series with said control winding between the first and second terminals of said DC voltage source and said third transistor controlling the charge and discharge of said first capacitor so as to flow said exciting current through said control winding.

3. A starting circuit for an inverter comprising:
   a. a DC voltage source having first, second and voltage reference terminals;
   b. an input transformer having a primary winding, a pair of secondary windings and a saturable magnetic core;
   c. an output transformer having a primary winding, a secondary winding and a feedback winding;
   d. first and second transistors each having base, emitter and collector electrodes, the collector-emitter circuits of which are connected, through the primary winding of said output transformer, between the first and voltage reference terminals of said DC voltage source, and between the second and voltage reference terminals thereof, respectively, and the base-emitter circuits of which are connected across the corresponding secondary windings of said input transformer, respectively;

e. circuit means for connecting the primary winding of said input transformer to the feedback winding of said output transformer;

f. DC voltage output means connected across the secondary winding of said output transformer;

g. first control means including at least a control winding provided in connection with said saturable magnetic core of said input transformer, for causing an exciting current to flow through said control winding so as to put one of said first and second transistors in its conductive state when said DC voltage source is operated;

h. second control means for detecting the secondary voltage of said output transformer and stopping the operation of said first control means when the secondary voltage reaches a predetermined value;

i. said first control means including a first capacitor and a third transistor having base, emitter and collector electrodes, said first capacitor being connected in series with said control winding between the first and second terminals of said DC voltage source and said third transistor controlling the charge and discharge of said first capacitor so as to flow said exciting current through said control winding; and j. a second capacitor and a fourth transistor having base, emitter and collector electrodes, the collector-emitter circuit of which is connected between the first and second terminals of said DC voltage source through first biasing means, and the collector-base circuit of which is connected between the base and collector electrodes of said third transistor whose base-emitter circuit is connected across said first biasing means, said second capacitor being connected between the base and emitter electrodes of said fourth transistor, and one terminal of said second capacitor being supplied with a biasing voltage through second biasing means which is connected between the first and second terminals of said DC voltage source.

4. A starting circuit for an inverter according to claim 3, in which said first biasing means comprises a first resistor, and said second biasing means comprises a series connection of second and third resistors, the connection point of which is connected to said one terminal of said second capacitor.

5. A starting circuit for an inverter according to claim 3, in which said second control means is provided between the base electrode of said fourth transistor and one terminal of the feedback winding of said output transformer.

6. A starting circuit for an inverter according to claim 5, in which said second control means includes at least a diode, the anode side of which is connected to the base electrode of said fourth transistor and the cathode side of which is connected to said one terminal of said feedback winding of said output transformer.

7. A starting circuit for an inverter according to claim 6, in which said DC voltage output means includes a diode bridge circuit connected across the secondary winding of said output transformer.

8. A starting circuit for an inverter according to claim 7, further including a current feedback winding connected in series with said primary winding of said output transformer.

9. A starting circuit for an inverter according to claim 8, in which said DC voltage source includes a diode bridge rectifier and a series connection circuit of third and fourth capacitors, a pair of connection points of said diode bridge rectifier being supplied with an AC signal source and the other pair of connection points thereof being connected across said series connection circuit, the terminals of which are said first and second terminals of said DC voltage source, the connection point of said third and fourth capacitors being said voltage reference terminal of said DC voltage source.

* * * * *